United States Patent
Dombek

(10) Patent No.: US 6,675,811 B2
(45) Date of Patent: Jan. 13, 2004

(54) METHOD OF AND APPARATUS FOR INCREASING THE PERMEABILITY OF WRAPPERS OF ROD-SHAPED ARTICLES

(75) Inventor: Manfred Dombek, Dassendorf (DE)

(73) Assignee: Hauni Maschinenbau AG, Hamburg (DE)

(*) Notice: Subject to any disclaimer, the term of this patent is extended or adjusted under 35 U.S.C. 154(b) by 119 days.

(21) Appl. No.: 09/775,638

(22) Filed: Feb. 5, 2001

(65) Prior Publication Data

US 2002/0062832 A1 May 30, 2002

(30) Foreign Application Priority Data

Feb. 4, 2000 (DE) ......................................... 100 04 906
Feb. 4, 2000 (DE) ......................................... 100 04 908

(51) Int. Cl.⁷ ..................... B23K 26/00; B23K 26/06; A24C 5/60
(52) U.S. Cl. ........................... 131/281; 219/74; 219/76; 219/78
(58) Field of Search ................... 131/280, 281; 219/120.2, 121.21, 121.26, 121.77, 121.82

(56) References Cited

U.S. PATENT DOCUMENTS

| | | | |
|---|---|---|---|
| 3,483,873 A | * 12/1969 | Hinzmann .................. 131/281 |
| 4,121,595 A | 10/1978 | Heitmann et al. | |
| 4,240,448 A | 12/1980 | Heitmann et al. | |
| 4,281,670 A | 8/1981 | Heitmann et al. | |
| RE31,478 E | * 12/1983 | McArthur et al. .......... 219/121 |
| 4,519,680 A | * 5/1985 | Grollimund .................. 359/212 |
| 4,524,785 A | 6/1985 | Seragnoli et al. | |
| 4,660,578 A | 4/1987 | Mattei et al. | |
| 4,720,619 A | * 1/1988 | Mattei et al. ............. 219/121.7 |
| 4,825,882 A | 5/1989 | Hinz | |
| 4,860,773 A | * 8/1989 | Okumoto et al. ........... 131/281 |
| 5,135,008 A | 8/1992 | Oesterling et al. | |
| 5,148,818 A | 9/1992 | Arthur | |
| 5,179,965 A | * 1/1993 | Komori et al. ............. 131/281 |
| 5,186,184 A | * 2/1993 | Aindow et al. ............. 131/281 |
| 6,064,032 A | * 5/2000 | Voss et al. ............. 219/121.67 |
| 2002/0158050 A1 | * 10/2002 | Voss ........................ 219/121.7 |

FOREIGN PATENT DOCUMENTS

| | | |
|---|---|---|
| DE | 27 51 522 C2 | 8/1978 |
| DE | 33 10 930 | 10/1983 |
| DE | 34 31 051 | 3/1985 |
| DE | 34 31 067 | 3/1985 |
| DE | 42 18 266 A 1 | 12/1993 |
| GB | 1046489 | 10/1966 |
| GB | 2146229 | 4/1985 |
| GB | 2 267 474 | 12/1993 |

OTHER PUBLICATIONS

U.S. patent application Ser. No. 09/457,346, Dombek et al., filed Dec. 8, 1999.
U.S. patent application Ser. No. 09/461,182, Dombek, filed Dec. 14, 1999.

* cited by examiner

Primary Examiner—Steven P. Griffin
Assistant Examiner—Carlos Lopez
(74) Attorney, Agent, or Firm—Venable LLP; Robert Kinberg; Chad C. Anderson

(57) ABSTRACT

Apparatus for increasing the permeabilities of central portions of tubular wrappers which form part of successive filter cigarettes of double unit length being turned out by a tipping machine. The central portions of the wrappers include adhesive-coated uniting bands which are convoluted around filter mouthpieces in a first portion of a rolling channel for successive filter cigarettes. A perforating unit which employs laser beams is set up to simultaneously perforate the central portions of the wrappers of several successive cigarettes in a second portion which immediately follows or partially overlaps the first portion of the channel. Each wrapper can be provided with two or more annular arrays of perforations.

10 Claims, 3 Drawing Sheets

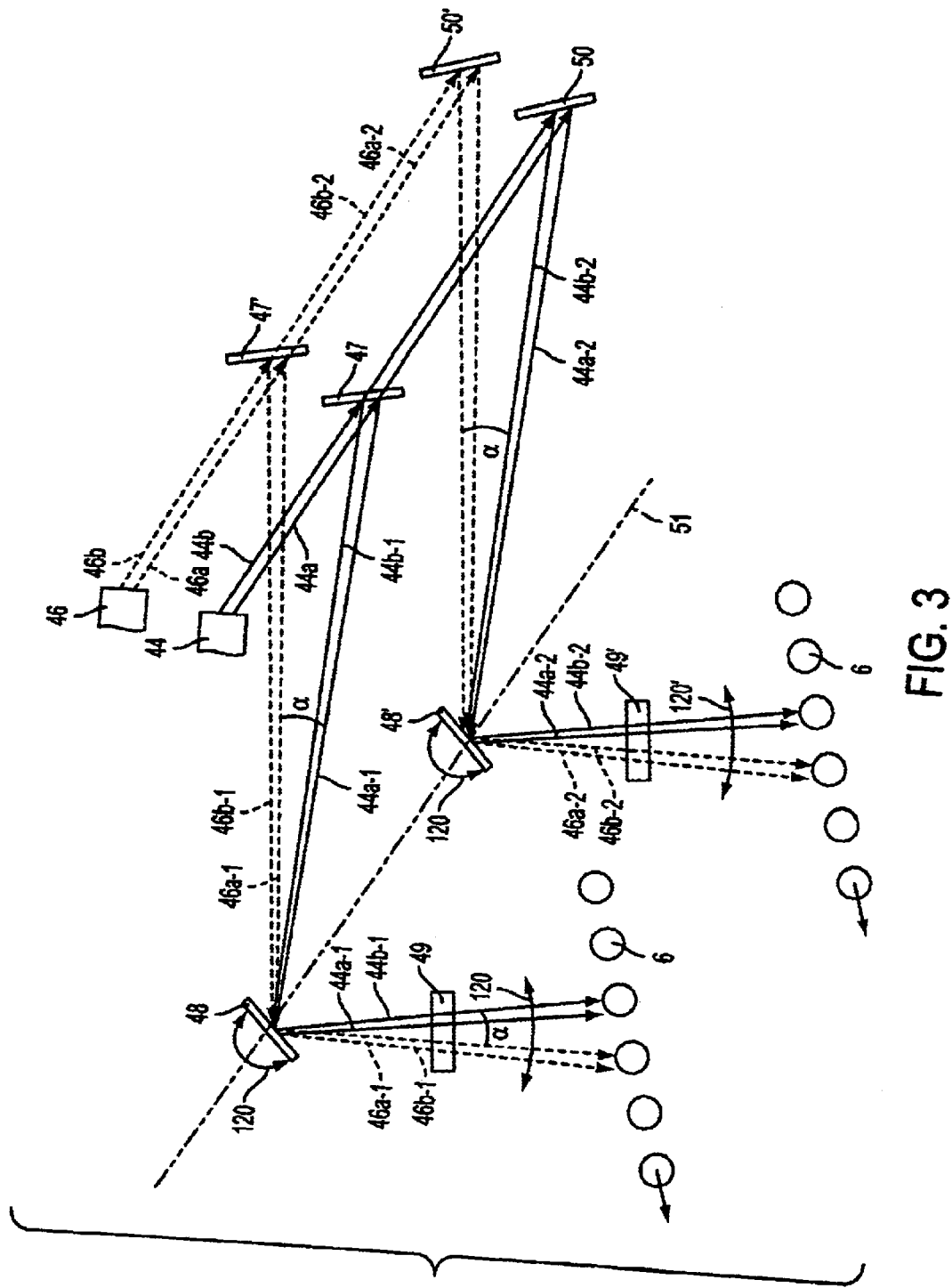

METHOD OF AND APPARATUS FOR INCREASING THE PERMEABILITY OF WRAPPERS OF ROD-SHAPED ARTICLES

CROSS-REFERENCE TO RELATED CASES

The present application claims the priorities of commonly owned German patent applications Serial Nos. 100 04 906.04 and 100 04 908.7 both filed Feb. 4, 2000. The disclosures of the above-referenced German patent applications, as well as that of each U.S. and foreign patent and patent application identified in the specification of the present application, is incorporated herein by reference.

BACKGROUND OF THE INVENTION

This invention relates to improvements in the making and processing of rod-shaped articles. Examples of articles which can be mass-produced and processed in accordance with the method and in the apparatus of the present invention are filter cigarettes and analogous rod-shaped smokers' products wherein coaxial rod-shaped components are held together by convoluted bands or strips of adhesive-coated paper, artificial cork or the like.

Filter cigarettes are mass produced in so-called tipping machines which are designed to connect one or more plain cigarettes of unit length or multiple unit length with one or more filter mouthpieces of unit length or multiple unit length. Connections are established by adhesive-coated uniting bands which are rolled in a channel around the locations where the ends of the mouthpieces are adjacent to and normally abut the ends of the plain cigarettes. This results in the conversion of uniting bands into tubular sleeves or collars which, as a rule or in many instances, completely surround the filter mouthpieces and further surround the adjacent end portions of plain cigarettes.

Prior to entry into the channel, each uniting band extends, e.g., tangentially, from the respective group of coaxial rod-shaped constituents (one or more filter mouthpieces and one or more plain cigarettes); such tangentially extending uniting bands are converted into the aforementioned tubular sleeves in response to rolling of the respective groups in the channel which is bounded by two surfaces at least one of which moves relative to the other. Reference may be had, for example, to commonly owned U.S. Pat. No. 4,825,882 granted May 2, 1989 to Werner Hinz for "APPARATUS FOR ROLLING UNITING BANDS AROUND GROUPS OF ROD-SHAPED ARTICLES". A presently preferred apparatus for making filter cigarettes (normally filter cigarettes of double unit length) is disclosed in commonly owned U.S. Pat. No. 5,135,008 granted Aug. 4, 1992 to Erwin Oesterling et al. for "METHOD OF AND APPARATUS FOR MAKING FILTER CIGARETTES".

It is customary to provide the tubular envelopes of filter cigarettes and analogous rod-shaped smokers' products with perforations, i.e., to increase the permeability of the envelopes. At the present time, such perforations are formed by directing pulsating beams of coherent corpuscular radiation against selected portions of wrapping material for plain cigarettes or filter mouthpieces, against the wrapping material which is thereupon converted into discrete uniting bands, or against the tubular wrappers of finished plain or filter cigarettes or the like. The purpose of perforations in the tubular wrappers of rod-shaped smokers' products (such as the wrappers of mouthpieces forming part of filter cigarettes) is to admit cool atmospheric air into the column of tobacco smoke flowing from the lighted end of a filter cigarette into the mouth of the smoker. Such atmospheric air is believed to exert a desirable influence upon the nicotine and condensate in tobacco smoke. U.S. Pat. No. 4,281,670 (granted Aug. 4, 1981 to Uwe Heitmann et al. for "APPARATUS FOR INCREASING THE PERMEABILITY OF WRAPPING MATERIAL FOR ROD-SHAPED SMOKERS' PRODUCTS") discloses certain presently preferred apparatus which employ laser beams and can be utilized to make holes in the wrappers of plain cigarettes, filter rod sections, filter cigarettes and other rod-shaped smokers' products.

OBJECTS OF THE INVENTION

An object of the invention is to provide a novel and improved method of altering or selecting (particularly increasing) the permeabilities of the wrappers of rod-shaped products, such as plain or filter cigarettes or like or analogous rod-shaped products, especially smokers' products, which is less likely to entail damage to the products than heretofore known methods.

Another object of the invention is to provide a method of shortening the intervals which are required to make and to further process, particularly perforate, filter cigarettes and the like.

A further object of the present invention is to provide a novel and improved method of assembling and processing, especially changing the permeability of the wrappers of, rod-shaped smokers' products in a time- and space-saving manner.

An additional object of the invention is to provide a method of the above outlined character which can be practiced by resorting to relatively simple, compact and reasonably priced apparatus.

Still another object of the instant invention is to provide a novel and improved apparatus for the practice of the above outlined method.

A further object of the invention is to provide a novel and improved machine for the making of filter cigarettes and analogous rod-shaped smokers' products.

Another object of the invention is to provide a combined filter tipping and wrapper perforating machine, especially for the mass production of plain or filter cigarettes, cigars, cigarillos and analogous rod-shaped smokers' products.

An additional object of the invention is to provide a novel and improved apparatus for rolling rod-shaped articles in a filter tipping machine preparatory to and in the course of changing the permeabilities of the wrappers of such products.

Still another object of the invention is to provide a novel and improved perforating unit for use in a filter tipping machine or another machine for the making of rod-shaped smokers' products.

A further object of the present invention is to provide novel and improved devices for accelerating and decelerating rolling movements of rod-shaped articles in the perforating unit of a tipping machine for cigarettes or the like.

Another object of the invention is to provide high-quality rod-shaped commodities, especially high-quality plain or filter cigarettes, cigarillos, cigars and the like.

An additional object of the invention is to provide a filter tipping machine wherein the mechanism or mechanisms which assembles or assemble plain cigarettes with filter mouthpieces and the mechanism or unit which changes the permeabilities of tubular wrappers of the constituents of filter cigarettes or analogous smokers' products cooperate with each other in a novel and improved way.

Still another object of the invention is to provide a novel and improved mode of installing laser-operated perforating devices or units for the tubular wrappers of rod-shaped commodities in a machine wherein such commodities must be rolled for a number of different reasons.

A further object of the instant invention is to provide a filter tipping machine wherein rod-shaped articles can be rolled at optimum speeds for each of a plurality of different purposes such as the application of adhesive-coated uniting bands which bond plain cigarettes to filter mouthpieces and the making of perforations in the tubular wrapper or wrappers for one or more constituents of a filter cigarette or the like.

SUMMARY OF THE INVENTION

One feature of the present invention resides in the provision of a method of changing the permeabilities of tubular wrappers of rod-shaped products, for example, filter cigaretes and analogous rod-shaped products of the tobacco processing industry. The method comprises the step of simultaneously changing the permeabilities of wrappers of a plurality of products, for example, of successive pairs of neighboring products of a short or long series of products.

The permeability changing step can include perforating the wrappers of $n \geq 2$ products (n is a natural number).

In accordance with one presently preferred embodiment of the improved method, the perforating step includes establishing a source of n at least substantially parallel laser beams, and directing the n beams upon n–x oscillatable beam reflecting mirrors to focus the n beams upon the wrapper of at least one product (x is a natural number less than n). For example, n can equal two. Such method can further comprise the steps of moving the products in the course of the changing step and oscillating each mirror to thus focus the beams upon the wrappers of moving prooducts.

The changing step can include simultaneously perforating m selected portions of the wrapper of each product. The number (m) of selected portions of the wrapper is a natural number and can equal or exceed two. The perforating step can include directing m substantially parallel pulsating laser beams upon the wrapper of each prodct. In accordance with a presently preferred embodiment of the method, the perforating step includes simultaneously directing p laser beams upon q partially reflecting mirrors to reflect a first portion and to permit passage of a second portion of each laser beam, and directing the second portions of the laser beams against at least one fully reflecting mirror (m can equal p (q+1) wherein p is a natural number and q is a natural number including zero).

Another feature of the present invention resides in the provision of a device or unit for changing the permeabilities of tubular wrappers of a series of at least substantially equidistant rod-shaped products. The improved device comprises means for emitting n laser beams, and means for simultaneously directing the laser beams upon the wrappers of n products (n is a natural number greater than one). The directing means comprises n–x movable mirrors which are arranged to deflect a plurality of laser beams making an acute angle the magnitude of which is a function of the distance between neighboring products of the series (x is a natural number less than n).

The permeability changing device can further comprise means for moving the products of the series along a predetermined path (e.g., in a straight channel or in an arcuate channel) and means for oscillating each mirror to thus focus the beams upon the wrappers of selected products in the predetermined path. The directing means can include means for simultaneously focussing at least one discrete beam of corpuscular radiation upon each of m different portions of the wrapper of each of the series of products in the path (m is a natural number greater than one). The oscillating means can include means (such as a motor) for oscillating the n–x mirrors about a common axis.

The mirrors can include q=(m/p)–1 partially transmitting mirrors which are arranged to split each of p incident beams into a reflected first portion and a transmitted second portion, and at least one fully reflecting mirror for the second portions of the beams (p is a natural number and q is a natural number including zero).

A further feature of the instant invention resides in the provision of an apparatus for treating smokers' products of the type wherein a rod-shaped component (such component can contain or consist of tobacco and/or filter material for tobacco smoke) is surrounded by a tubular wrapper carrying a deformable strip, such as a band of so-called tipping paper used in the making of filter cigarettes. The improved apparatus comprises a rolling unit having a plurality of surfaces which define a channel and include at least one first surface arranged to move relative to at least one second surface. The channel has an inlet and an outlet and the apparatus further comprises means for feeding into the inlet successive products of a series of products having tubular wrappers each of which is contacted by the respective strip so that the wrappers are caused to roll due to contact with the aforementioned surfaces and to thus convolute the strips about the respective wrappers in the channel. The improved apparatus still further comprises means for changing the permeabilities of the wrappers during rolling in a predetermined portion of the channel; such changing means comprises means for simultaneously perforating the wrappers of at least two products in the predetermined portion of the channel.

Further to the aforementioned predetermined portion, the channel includes an additional portion which is disposed at the inlet; the strips are convoluted around the respective wrappers in such additional portion of the channel. The predetermined portion of the channel can immediately follow the additional portion (as seen in a direction from the inlet toward the outlet of the channel), and the perforating means is or can be arranged to change the permeabilities of the wrappers of products at least in the predetermined portion of the channel (i.e., the perforating treatment can begin while the products are still in the additional portion of the channel).

It is often preferred to impart to the channel an arcuate shape. This can be carried out by employing a rolling unit which comprises a rotary conveyor (such as a rotary drum-shaped conveyor) having a cylindrical peripheral surface which constitutes the at least one first surface, and a stationary rolling member having a concave surface which is concentric with and is spaced apart from the peripheral surface of the drum-shaped conveyor; such concave surface then constitutes the at least one second surface.

The improved apparatus can be incorporated into or associated with a tipping machine which turns out filter cigarettes or analogous rod-shaped smokers' products.

The novel features which are considered as characteristic of the invention are set forth in particular in the appended claims. The improved apparatus and the improved permeability changing device themselves, however, both as to their construction and the modes of assembling, installing and utilizing the same, together with numerous additional impor-

BRIEF DESCRIPTION OF THE DRAWINGS

FIG. 3 is a diagrammatic view of one presently preferred embodiment of a wrapper perforating unit which can be utilized in the improved apparatus.

DESCRIPTION OF PREFERRED EMBODIMENTS

Figure 1:
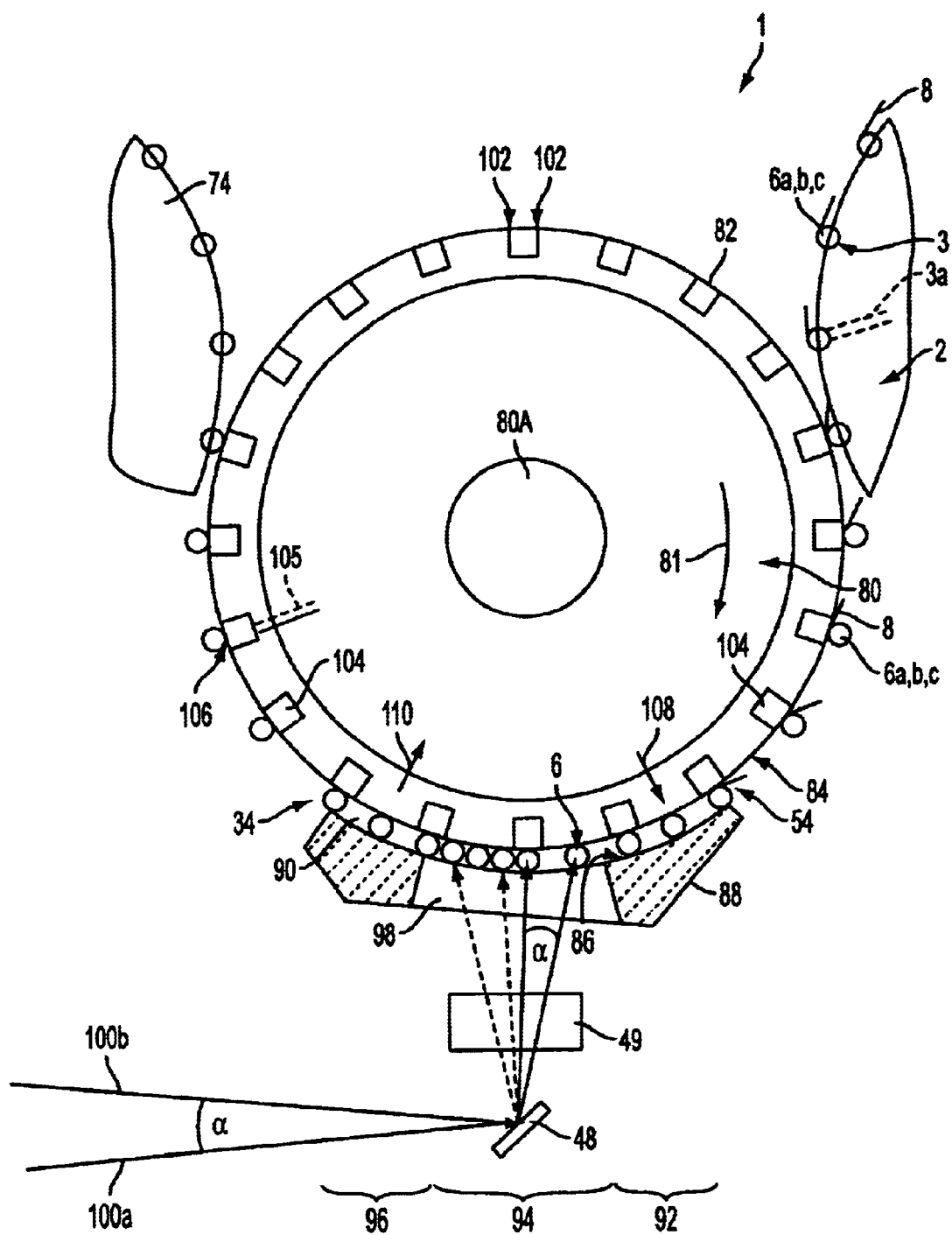
FIG. 1 is a somewhat schematic partly elevational and partly vertical sectional view of portion of a combined filter cigarette making and wrapper perforating apparatus which embodies one form of the present invention.

FIG. 1 shows an apparatus 1 which is designed to treat smokers' products 6. Each smokers' product comprises two plain cigarettes 6a, 6b (see FIG. 2) of unit length, a filter rod section or mouthpiece 6c of double unit length which is located between and is coaxial with the two plain cigarettes, and a tubular sleeve 8a which surrounds the entire filter rod section of double unit length and the adjacent inner end portions of the two plain cigarettes. The sleeve 8a is a converted strip-shaped uniting band 8 one side of which is coated with a suitable adhesive and a portion of which adheres to the tubular wrapper of the filter rod section 6c prior to treatment of the uniting band by a permeability changing (perforating) unit or device in accordance with the present invention. When the treatment of the groups of coaxial rod-shaped articles 6a, 6b, 6c is completed, the uniting band 8 (hereinafter called strip) is converted into a sleeve 8a which sealingly connects the filter rod section 6c to the adjacent inner end portions of the plain cigarettes 6a, 6b. The sleeve 8a form part of a composite tubular wrapper 112 (refer again to FIG. 2) which is composed of the tubular wrappers or envelopes of the plain cigarettes 6a, 6b (such envelopes are normally made of cigarette paper), of the tubular wrapper or envelope of the filter rod section 6c (this enveope can also consist of cigarette paper) and of the sleeve 8a. The latter can be made of imitation cork or the like. Such composite tubular wrapper 112 surrounds a rod-shaped component 113 (FIG. 2) which is composed of two rod-like tobacco fillers forming part of the plain cigarettes 6a, 6b and of a filter rod made, e.g., of acetate fibers and forming part of the filter rod section 6c.

In accordance with heretofore known methods (such as that disclosed in the aforementioned U.S. Pat. No. 5,135,008 to Oesterling et al.), the groups of parts 6a–6c and 8 are caused to pass through a first rolling channel (such as that defined by the parts 31, 32 shown in FIG. 1 of the '008 patent) in order to convert the uniting band or strip 8 into a sleeve 8a, and thereupon through a discrete second rolling channel (such as that shown in FIG. 13 of the aforementioned U.S. Pat. No. 4,281,670 to Heitmann et al.). This would entail repeated acceleration of successive groups 6a–6c from zero rolling speed to a desired or optimum rolling speed (first to ensure the conversion of successive uniting bands or strips 8 into cylindrical sleeves 8a and there-upon to ensure a proper increase of permeability of the composite tubular wrapper 112 of the filter cigarette 6 of double unit length). Moreover, the rolling speed of each filter cigarette of double unit length turned out by the apparatus of Oesterling et al. must be reduced to zero, and the same holds true for each filter cigarette which is subjected to a perforating (permeability influencing) treatment in accordance with the teaching of Heitmann et al.

Figure 2:
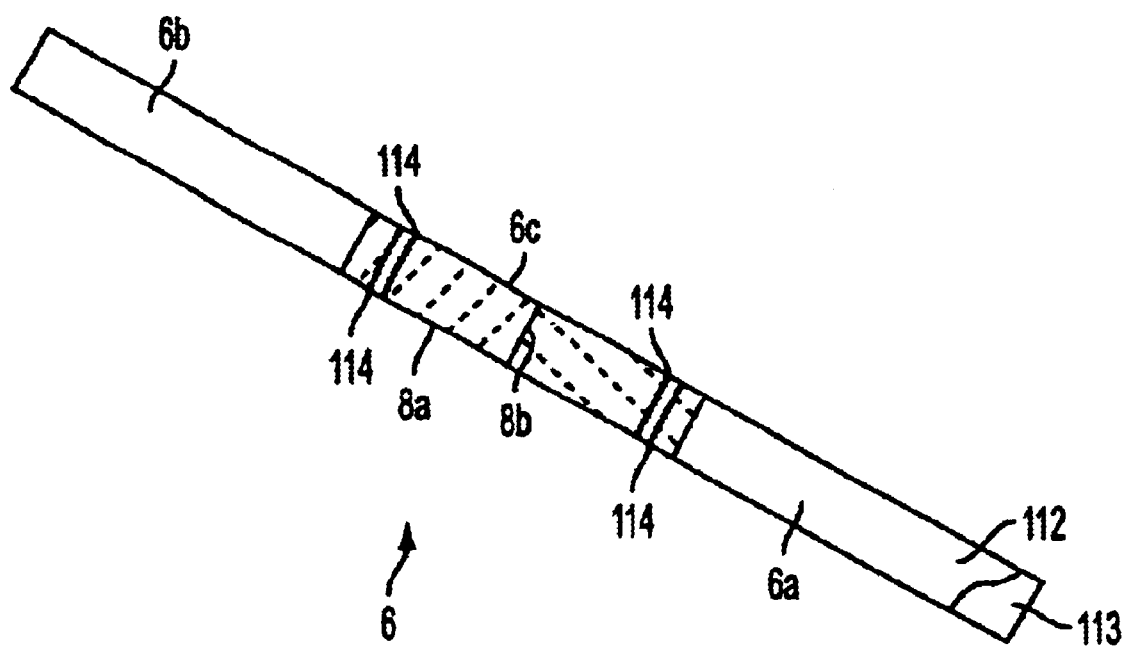
FIG. 2 is an elevational view of a filter cigarette of double unit length as it issues from the arcuate rolling channel of the apparatus shown in FIG. 1.

The apparatus 1 of FIG. 1 is constructed and assembled in such a way that successive groups including the parts 6a–6c, 8 are set in rolling motion only once, namely in an arcuate rolling channel 90 wherein the strips 8 are converted into sleeves 8a which sealingly bond the respective parts 6a, 6b, 6c to each other (i.e., which connect such parts into filter cigarettes 6 of double unit length). Furthermore, each freshly formed filter cigarette 6 continues to roll and to thus advance into the range of a novel permeability changing (perforating) unit including at least one source of corpuscular radiation which provides the sleeve 8a with a requisite number of suitably distributed perforations. FIG. 2 shows, by way of example only, four annuli 114 of perforations provided in the sleeve 8a (converted strip 8) and in the tubular envelope (not shown) of the filter rod section 6c within such sleeve. The annuli 114 of perforations admit atmospheric air into the column of tobacco smoke flowing from the lighted end of a filter cigarette of unit length (i.e., one-half of the filter cigarette 6 shown in FIG. 2). Conversion of filter cigarettes (6) of double unit length into filter cigarettes of unit length takes place at a severing or subdividing station corresponding to that shown at 36, 37 in FIG. 1 of the patent to Oesterling et al. Each filter cigarette 6 is severed midway across the sleeve 8a (this is shown in FIG. 2, as at 8b).

That portion of the apparatus 1 which is shown in FIG. 1 comprises a rotary drum-shaped rolling conveyor 80 having a cylindrical peripheral surface 84 cooperating with the complementary concave surface 86 of a stationary rolling member 88 to define an arcuate rolling channel 90. The shaft 80a of the conveyor 80 is driven to rotate clockwise (arrow 81), and this conveyor receives successive groups 6a–6c (each of which carries a substantially tangentially extending adhesive-coated uniting band 8) from a rotary drum-shaped conveyor 2. The conveyor 2 has axially parallel peripheral flutes 3 which communicate with suction ports 3a (only one shown) to attract groups 6a–6c on their way from a source (such as the relevant part of the tipping machine disclosed by Oesterling et al.) to the transfer station between the conveyors 2 and 80.

The peripheral surface 84 of the conveyor 80 is provided with relatively shallow equidistant axially parallel grooves or flutes 82. The rolling channel 90 includes a first portion 92 which is adjacent the inlet 54 and wherein the uniting bands or strips 8 are convoluted around the rod-shaped sections 6c of the respective groups 6a–6c, a second portion 94 wherein the tubular wrappers 112 of successive freshly formed filter cigarettes 6 of double unit length are provided with perforations 114 (reference should be had again to FIG. 2), and a third portion (transporting portion) 96 wherein the filter cigarettes 6 advance toward the outlet 34 of the rolling channel 90.

The rolling member 88 has a centrally located opening or window 98 which permits beams 100a, 100b of coherent radiation to penetrate into the channel portion 94 and to perforate selected portions of the wrappers 112 of successive filter cigarettes 6 of double unit length. The means for deflecting the beams 100a, 100b comprises an oscillating mirror 48 and such beams are caused to follow filter cigarettes 6 in the channel portion 94 by suitable optical means including a focus-corrected lens 49. The beams 100a, 100b make an acute angle α which is selected in such a way that these beams can simultaneously change the permeabilities of two successive filter cigaretes 6 in the channel portion 94.

An advantage of such mode of operation is that a longer interval of time is available for each perforating operation. Thus, the speed of rolling movement of filter cigarettes 6 in the channel 90 can be reduced accordingly which reduces the likelihood of damage to the filter cigarettes rolling past the window 98 in the stationary rolling member 88 without causing a reduction of the output of the production line which embodies a tipping machine employing the apparatus 1 of FIG. 1.

In order to avoid the need for rolling movements of successive groups 6a–6c over the axially parallel edges or ridges 102 (which flank the front and rear sides of the flutes 82 in the peripheral surface 84 of the conveyor 80) while such groups begin to roll at the inlet 54 of the arcuate rolling channel 90, the conveyor 80 carries radially movable displacing elements 104 in the form of pushers which are caused to move radially outwardly (see the arrow 108) at the inlet 54 of the channel 90 and to thus lift the groups 6a–6c out of the respective flutes 82. The pushers 104 remain extended (to at least partially but preferably completely or nearly completely fill the respective flutes 82) during travel past the rolling channel 90 but are retracted at the outlet 34 of this channel so that the finished filter cigarettes 6 of double unit length can reenter the respective flutes, for example, by suction. To this end, the flutes 82 communicate with suction ports 105 (one shown in the left-hand portion of the conveyor 80) which begin to communicate with a suitable suction generating device (e.g., with the suction intake of a fan, not shown) upon arrival at the outlet 34 of the rolling channel 90 all the way to the transfer station between the conveyor 80 and a take-off conveyor 74 for successive cigarettes 6.

The outer faces 106 of the pushers 104 are configurated to lie flush with the adjacent portions of the peripheral surface 84 of the drum-shaped conveyor 80 during travel past the rolling channel 90. These pushers are retracted into the conveyor 80 (see the arrow 110) not later than downsteam of the transfer conveyor 74 so that the flutes 82 are again ready to receive fresh groups 6a–6c at the transfer station between the conveyors 2 and 80. In fact, the pushers 104 can be retracted from the respective flutes 82 immediately downstream of the outlet 34 of the rolling channel 90 so that such flutes can then receive succesive finished filter cigarettes 6 and deliver them to the transfer station between the conveyors 80 and 74.

FIG. 2 shows a finished filter cigarette 6 of double unit length as it appears upon advancement with and relative to the conveyor 80 in the channel portion 96 (i.e., upon completion of the perforating operation in the channel portion 94), in its flute 82 on the way from the channel 90 to the conveyor 74 and in a flute of the conveyor 74. FIG. 2 further shows that the four annuli 114 of perforations form two pairs of closely adjacent annuli which are provided at opposite sides of the location of future cut 8b and extend through the convoluted strip (sleeve) 8a as well as through the wrapper of the filter rod section 6c. The wrapper of the filter rod section 6c is surrounded by the sleeve (convoluted strip) 8a. Each of the annuli 114 can constitute a circumferentially complete ring-shaped array of equidistant perforations having substantially identical sizes and/or shapes.

FIG. 3 illustrates another presently preferred manner of directing pairs of at least substantially parallel laser beams 44a, 44b and 46a, 46b toward and into the window 98 of the stationary rolling member 88 shown in FIG. 1 to provide successive filter cigarettes 6 with two pairs of annular arrays 114 of perforations. Two sources 44, 46 respectively discharge pulsating laser beams 44a, 44b and 46a, 46b. These pairs of beams are partially reflected by mirrors 47, 47' and those portions of the beams 44a, 44b and 46a, 46b which are transmitted by the mirrors 47, 47' are fully reflected by additional mirrors 50, 50'. Two oscillatable mirrors 48, 48' (the oscillating means can include a suitable motor 151) cause the pairs of beams 44a-1, 44b-1 and 46a-1, 46b-1 (mirror 48) and 44a-2, 44b-2 and 46a-2, 46b-2 (mirror 48') to impinge upon lenses 49, 49' which cause the beams to travel (see the double-headed arrows 120 and 120') with the filter cigarettes 6 rolling in the channel portion 94. The character 51 denotes in FIG. 3 the common axis about which the mirrors 48, 48' are oscillated by the motor 151.

The making of perforations (such as those forming part of the arrays 114) can begin (in the rolling channel 90) even before the conversion of strips 8 into sleeves 8a is completed. This might not be necessary if the portion 94 of the arcuate rolling channel 90 suffices to complete the perforating step without necessitating a rolling of the groups 6a–6c at an excessively high speed.

Certain features of the illustrated presently preferred embodiments of the improved apparatus (respectively shown in FIGS. 1 and 3) are believed to be novel per se and, therefore, merit patent protection with as well as independently of other features of the respective apparatus. For example, the features which are shown in and which are described with reference to FIGS. 1 to 3 are believed to merit patent protection individually (such as the two perforating units) as well as jointly with other features (such as the means defining an arcuate rolling channel 90 which extends beyond the perforating unit (window 98)).

FIG. 3 illustrates the manner of providing successive filter cigarettes 6 of double unit length with four (preferably circumferentially complete) annuli 114 of perforations in a distribution similar to or identical with that shown in FIG. 2. Two substantially or nearly parallel laser beams 44a, 44b are emitted by a source (laser) 44 and are caused to impinge upon the partially transmitting mirror 47. The mirror 47 respectively splits the beams 44a and 44b into pairs of beams 44a-1, 44b-1 and 44a-2, 44b-2. The beams 44a-1 and 44b-1 are reflected upon the oscillating lens 48 and the beams 44a-2, 44b-2 penetrate through the mirror 47 and are deflected by the fully reflecting mirror 50 to impinge upon a second oscillating lens 48'. The directions of oscillatory movements of the lenses 48, 48' are respectively indicated by the double-headed arrows 120, 120'. The lenses 48, 48' respectively direct the beams 44a-1, 44b-1, 46a-1, 46b-1 and 44a-2, 44b-2, 46a-2 and 46b-2 upon the focussing lenses 49, 49'. The lenses 49, 49' respectively focus the beams 44a-1, 44b-1, 44a-2, 44b-2 upon two discrete filter cigarettes 6, or upon different parts of a single cigarette 6, in the portion 94 of the rolling channel 90.

The two mirrors 48, 48' are oscillatable (by the motor 151) about a common axis 51; this axis is normal to the plane of FIG. 1. The partly transmitting mirror 47' divides the beams 46a, 46b into two pairs of substantially parallel beams 46a-1, 46b-1 and 46a-2, 46b-2 which enable the perforating device or unit to provide each of the series of successive filter cigarettes 6 in the channel portion 94 with four annuli 114 of perforations; the lenses 49, 49' cause the respective pairs of beams 46a-1, 46b-1 and 46a-2, 46b-2 to remain focussed upon the selected cigarette or cigarettes 6 while such cigarette(s) rolls or roll in the portion 94 of the channel 90.

In order to permit for simultaneous perforating of two discrete filter cigarettes 6 of double unit length, the second source 46 of FIG. 3 emits (simultaneously with the source 44) the additional pair of laser beams 46a, 46b which are substantially parallel to each other and are shown in FIG. 3 by broken lines. The reflected portions 44a-1, 44b-1 of the beams 44a, 44b make with the reflected portions 46a-1, 46b-1 of the beams 46a, 46b an angle α which is selected in such a way that it corresponds to or is a function of the distance between two successive filter cigarettes 6 in the portion 94 of the rolling channel 90. Thus, the perforating unit or device of FIG. 3 renders it possible to simultaneously perforate the wrappers 112 of two successive cigarettes 6 in the channel portion 94. The beams 46a, 46b are treated (by mirrors 47', 50' and by the lens 48') in the same way as described in connection with the beams 44a, 44b. The pairs of beams which are obtained upon splitting of the beams 46a, 46b are respectively shown at 46a-1, 46b-1 and 46a-2 and 46b-2; such pairs of beams are substantially parallel to each other.

An important advantage of the improved method and apparatus is that the distances between successive cigarettes 6 in the channel portion 94 can be less than those on the conveyor 80 and/or 2 and/or 74, and that such closely adjacent successive cigarettes 6 can be advanced (sideways) at a relatively low speed without it being necessary to reduce the output of the apparatus 1 per unit of time. This means that the speed at which the cigarettes 6 roll in the channel portion 94 can be reduced which, in turn, reduces the likelihood of damage to the wrappers 112 because the cigarettes are treated more gently than those which must roll at a high or very high speed.

The manner in which the shaft 80A of the conveyor 80 (and the shafts of the conveyors 2, 74) can be driven is or can be the same as described in my commonly owned copending patent application Ser. No. _____.

By way of example, the improved apparatus 1 can be set up to simultaneously perforate the wrappers 112 of two articles or products 6. Such apparatus can employ the laser beams 100a, 100b of FIG. 1 which make an acute angle α the magnitude of which depends upon the mutual spacing of successive products 6 in that portion (such as 94) of the rolling channel 90 wherein the perforating of the wrappers 112 takes place or should take place. Thus, a single oscillatable mirror (such as the mirror 48 shown in FIG. 1) suffices to simultaneously perforate the wrappers 112 of several products.

It is possible to further simplify the just described apparatus by omitting the mirror 48 of FIG. 1, i.e., by causing the beams 100a, 100b to impinge directly upon the wrappers 112 of several successive rod-shaped products (such as the illustrated filter cigarettes 6 of double unit length). It is often desirable to employ one or more focus-corrected optical elements (49) in order to even more reliably ensure accurate focussing of laser beams upon the products 6 in the rolling channel.

The single mirror (such as the mirror 48 shown in FIG. 1) is or can be oscillatable by a suitable motor (corresponding to the motor 151 shown in FIG. 3). Such arrangement is desirable because it permits for accurate focussing of laser beams (such as 100a, 100b) upon products 6 which are in motion, i.e., which roll in a channel such as the channel 90 of FIG. 3.

The apparatus which embodies the structure of FIG. 3 exhibits the additional advantage that (a) it can simultaneously perforate the wrappers 112 of several successive products 6, and (b) it can simultaneously provide each of the products 6 within the range of the improved perforating unit or device with several arrays (such as the annuli 114) of perforations. This is especially desirable in the tobacco processing industry, and more specifically in connection with the making of rod-shaped smokers' products which must be provided with pronounced ventilating zones capable of admitting substantial amounts of atmospheric air into the column of tobacco smoke. The arrangement which is shown in and which was already described with reference to FIG. 1 is designed to provide each filter cigarette of unit length (i.e., each half of the filter cigarette 6 shown in FIG. 2) with two arrays or groups of annuli 114 of perforations. This is accomplished by resorting to a plurality of partially transmitting mirrors (47, 47') which reflect the portions 44a-1, 44b-1 and 46a-1, 46b-1 of the incident substantially parallel beams 44a, 44b but permit the portions 44a-2, 44b-2 and 46a-2, 46b-2 to pass therethrough. The portions 44a-2, 44b-2 and 46a-2, 46b-2 are thereupon fully reflected by the mirrors 50, 50' to respectively impinge upon and to be reflected by the oscillatory mirrors 48, 48'. The mirrors 48, 48' can be omitted, i.e., the pairs of beam portions 44a-2, 44b-2 and 46a-2, 46b-2 can be caused to impinge directly upon the wrappers 112 of two discrete cigarettes 6 of double unit length while such cigarettes roll in the channel portion 94 or in the channel portion 94 and in a part of the channel portion 92. The total number of laser beams which are available for the making of perforations can be ascertained by resorting to the equation $m=p(q+1)$; m is the number of laser beams emitted by the source or sources (such as 44, 46), p is the number of incident laser beams (44a, 44b, 46a, 46b), and q is the number of partially transmitting mirrors 47, 47'). The number q can equal zero or any other natural number.

If the beams 44a, 44b of FIG. 3 (corresponding to the beams 100a, 100b of FIG. 1) are partially reflected by a single mirror 47 and the portions 44a-2 44b-2 are fully reflected by the mirror 50, one obtains two pairs of substantially parallel beams 44a-1, 44b-1 and 44a-2, 44b-2. Such pairs of parallel or nearly parallel beams can be utilized for the making of four arrays (annuli) 114 of perforations in successive filter cigarettes 6 of double unit length.

The structures shown in FIGS. 1 to 3 of the present application are or can be identical with those respectively shown in FIGS. 6 to 8 of the aforementioned commonly owned copending patent application Ser. No. _____.

A further important advantage of the improved method and apparatus and perforating devices is that they render it possible to produce high-quality filter cigarettes, filter cigars, filter cigarillos and analogous products which must undergo several different treatments while rolling to move sideways past several treating and/or processing stations. Moreover, such several different treatments can be carried out and completed without affecting the appearance and/or other desirable characteristics of the ultimate products and without causing a reduction of the output of machines or production lines for the making of such products.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of varying the permeabilities of wrappers of rod-shaped smokers' products and of other rod-shaped articles and, therefore, such adaptations should and are intended to be comprehended within the meaning and range of equivalence of the appended claims.

What is claimed is:

1. A method of changing permeabilities of tubular wrappers of rod-shaped products of a tobacco processing industry, the method comprising:

simultaneously changing the permeabilities of wrappers of a plurality of the rod-shaped products of the tobacco processing industry consecutively conveyed in a conveying direction, said changing step including rolling the plurality of products, establishing at least two substantially parallel laser beams, directing the at least two laser beams upon a common beam reflecting mirror, oscillating the mirror and reflecting the at least two laser beams upon a first set of at least two consecutive rolling products, the oscillating step composing swiveling the mirror from a first position to a second position to move the at least two laser beams synchronously in the conveying direction of the first set of at least two rolling products, and swiveling the mirror opposite to the conveying direction back to the first position to reflect the at least two laser beams upon another set of at least two consecutive rolling products following the first set of at least two consecutive rolling products.

2. The method claim 1, wherein said changing step includes perforating the wrapper of n>2 products, n being a natural number.

3. The method of claim 2, wherein said perforating step includes establishing a source of n at least substantially parallel laser beams, and directing the n beams upon n−x oscillatable beam reflecting mirrors to focus the n beams upon the wrapper of at least one product, x being a natural number less than n.

4. The method of claim 3, wherein n equals two.

5. The method of claim 3, further comprising moving the products in the course of said changing step and oscillating each mirror to thus focus the beams upon the wrappers of moving products.

6. The method of claim 5, wherein n equals two.

7. The method of claim 2, wherein said changing step includes simultaneously perforating m selected portions of the wrapper of each product wherein $m \geq 2$ and is a natural number.

8. The method of claim 7, wherein m>2.

9. The method of claim 8, wherein said perforating step includes directing m substantially parallel pulsating laser beams upon the wrapper of each product.

10. A method of changing permeabilities of tubular wrappers of rod-shaped products of a tobacco processing industry, the method comprising simultaneously changing the permeabilities of wrappers of a plurality of the rod-shaped products of the tobacco processing industry, wherein said changing step includes perforating the wrappers of n>2 products, n being a natural number, wherein said changing step includes simultaneously perforating m selected portions of the wrapper of each product, wherein m>2 and is a natural number, said perforating step including directing m substantially parallel pulsating laser beams upon the wrapper of each product, said perforating step including simultaneously directing p laser beams upon q partially reflecting mirrors to reflect a first portion and to permit passage of a second portion of each laser beam, and directing the second portions of the laser beams against at least one fully reflecting mirror, m being equal to p (q+1), wherein p is a natural number and q is a natural number including zero.

* * * * *